United States Patent [19]

Anflo et al.

[11] Patent Number: 4,823,133

[45] Date of Patent: Apr. 18, 1989

[54] RADAR SYSTEM

[75] Inventors: Kjell S. Anflo, Hägersten; Jan W. I. Grabs; Roland H. Ivarsson, both of J/e,uml/a/ rfälla, all of Sweden

[73] Assignee: U.S. Philips Corporation, New York, N.Y.

[21] Appl. No.: 148,783

[22] Filed: Jan. 27, 1988

[30] Foreign Application Priority Data

Jan. 28, 1987 [SE] Sweden ............................ 8700329

[51] Int. Cl.$^4$ .......................... G01S 7/42; H03B 9/10
[52] U.S. Cl. ...................................... 342/199; 331/5; 331/88
[58] Field of Search .................... 342/199, 200; 331/5, 331/88, 90

[56] References Cited

U.S. PATENT DOCUMENTS

| | | | |
|---|---|---|---|
| 3,358,282 | 12/1967 | Wasterlid | 342/199 |
| 3,611,380 | 10/1971 | Carrlson | 342/199 |
| 4,547,775 | 10/1985 | Wehner et al. | 342/200 |

FOREIGN PATENT DOCUMENTS

| | | | |
|---|---|---|---|
| 2269719 | 11/1975 | France | 342/199 |
| 0075034 | 5/1982 | Japan | 331/5 |

Primary Examiner—Nelson Moskowitz
Assistant Examiner—Gilberto Barron, Jr.
Attorney, Agent, or Firm—Robert J. Kraus

[57] ABSTRACT

The invention relates to a radar system comprising a transmitter with a periodically tunable HF-transmitter tube, as a magnetron with rotating tuning body, and a receiver with a mixing stage, in which echo pulses caused by transmitted radar pulses are mixed with the output signal from a local oscillator, whose frequency can be controlled. During transmission the tuning frequency of the transmitter tube is varied periodically and in an interval before triggering the local oscillator is "slaved" to the transmitter tube, so that the local oscillator frequency follows the variations in the tuning frequency. In the triggering moment the local oscillator is locked in frequency to the value prevailing in the triggering moment. According to the invention this system is combined with a frequency predicting circuit, which mainly consists of a comparator. In this comparator the control signal of the local oscillator, which due to the said "slaving" represents the instantaneous tuning frequency, is compared with a reference signal. The transmitter tube is triggered when the two compared signals are in a given relationship to each other, e.g. equal. Hereby, the transmitter tube is brought to produce a radar pulse having a predicted frequency, which is mainly determined by the said reference signal.

5 Claims, 2 Drawing Sheets

RADAR SYSTEM

BACKGROUND OF THE INVENTION

The invention relates to a radar system comprising a transmitter having a periodically tunable HF-transmitter tube, as a magnetron with rotating tuning body, and a modulator adapted to trigger the transmitter tube for generation and transmission of a radar pulse, the frequency of which can vary in dependence upon the position of the triggering moment relative to the tuning curve produced by the periodic tuning, and a receiver with a local oscillator the output signal of which is mixed with echo pulses caused by the transmitted radar pulses for transforming these echo pulses to an intermediate frequency, the local oscillator operating at a frequency which can be controlled by means of a control signal and being included in a slave control circuit, in which the local oscillator in the interval before triggering of the transmitter tube is slaved to the transmitter tube, so that its frequency follows the variations in the turning frequency of the transmitter tube, while upon triggering the local oscillator is locked to a frequency value which produces the desired intermediate frequency with the transmitted radar pulse.

Such a system is suitable for transmission of radar pulses having randomly varying frequency, because, if the transmitter tube is triggered with a pulse signal which is independent of the periodic tuning, the transmitted pulses will have a frequency which varies randomly from pulse to pulse (jumping frequency mode).

However, in certain applications it is desirable to be able to bring such a radar system with a transmitter tube of this kind to operate is a mode with predicted transmitter frequency. In case of a magnetron with rotating tuning body it has previously been proposed for this purpose to reverse the tuning body and lock the body in a given angular position corresponding to the predicted frequency by means of a mechanical locking device. This solution has the drawback that it requires a special locking mechanism and that the switching from jumping frequency to predicted frequency will require a substantial time period.

SUMMARY OF THE INVENTION

The object of the present invention is to modify a radar system of the kind as described in the opening paragraph in a simple manner so that it can be brought to transmit one or more predicted frequencies and this with a so short switching time period that pulses with predicted frequency can be included in the pulse flow of pulses with jumping frequency from the radar system.

According to the invention this is solved thereby, that the described radar system furthermore comprises a frequency predicting circuit and switching means, whereby this frequency predicting circuit can be connected to the modulator. The frequency predicting circuit is then so arranged that it receives a first input signal from the control input of the local oscillator and a second input signal from a reference signal source and comprises a comparator, adapted to compare the said two signals and, when the circuit is connected to the modulator, to trigger the transmitter tube in case of a given mutual relationship, for example equality, between the compared signals.

In the system according to the invention the periodic variation of the tuning of the transmitter tube is allowed to continue also as transmission of predicted frequency and the transmitter frequency is determined by comparing the control signal of the local oscillator, which due to the described slave control of the oscillator to the transmitter tube before triggering is a measure of the instantaneous tuning frequency of the transmitter tube, and a reference signal which then represents the desired or predicted transmitter frequency. Hereby switching between jumping frequency mode and predicted frequency mode can be effected instantaneously by means of a pure electrical switching operation. However, the time interval between a pulse with predicted frequency and adjacent radar pulses can vary somewhat, because the triggering moment is now determined by the frequency predicting circuit.

The frequency predicting circuit comprises preferably a derivative compensating circuit, to which the control signal of the local oscillator is fed and which produces an additional signal to one of the input signals of the comparator, for example to the control signal of the local oscillator itself, which additional signal is determined by the instantaneous time derivative of the said control signal. Hereby the frequency error in the predicted frequency will be compensated for or be corrected, which error otherwise should arise as a result of the fact that the control signal of the local oscillator and thereby the tuning frequency of the transmitter tube will vary differently between the triggering time moment and the transmission time moment dependent upon where on the turning curve the triggering occurs.

In order to obtain an absolute frequency prediction the frequency predicting circuit comprises in a prefered embodiment a correction circuit to which is supplied on the one hand a signal representing the frequency of the transmitted pulse and on the other hand a reference magnitude which represents the predicted frequency. The correction circuit is so arranged that it produces a signal which is used as an additional signal to one of the input signals of the comparator, for example the reference signal, in order to, after transmission of a first pulse with predicted frequency correct the following pulses to the desired predicted value. Thus, in this case the first pulse with predicted frequency is used to measure the really obtained predicted value with use of only the reference signal as frequency determining control signal in an open control circuit. This measured value is then utilized for correcting the following pulses, so that these pulses will obtain the desired predicted value.

In one embodiment of the correction circuit this circuit comprises a reference oscillator, the frequency of which represents the said reference magnitude, a mixer to which is supplied on the one hand the output signal of the reference oscillator and on the other hand a portion of the energy in the HF-pulse, which is taken from the output of the HF-transmitter tube, and an FM discriminator to which the output signal of the mixer is fed and which produces a signal representing the difference between the frequency of the reference oscillator and the frequency of the transmitted pulse, which signal is fed to a memory for serving as a correction of one of the input signals of the comparator. In this case it is consequently the frequency of the reference oscillator, which determines the transmitted predicted frequency.

In another embodiment of the correction circuit this circuit comprises a measuring arrangement connected to the output of the local oscillator and delivering a signal, which represents the local oscillator frequency after locking the same at transmission of a radar pulse with predicted frequency, and a subtraction circuit to which is supplied on the one hand the output signal of the measuring arrangement and on the other hand the reference signal, the output signal of the subtraction circuit being fed to a memory for serving as correction of one of the input signals of the comparator. Thus, in this case the reference signal itself represents the transmitted predicted frequency.

BRIEF DESCRIPTION OF THE DRAWING

The invention is illustrated by means of example with reference to the accompanying drawing figures, in which.

DESCRIPTION OF THE PREFERRED EMBODIMENTS

Figure 1:
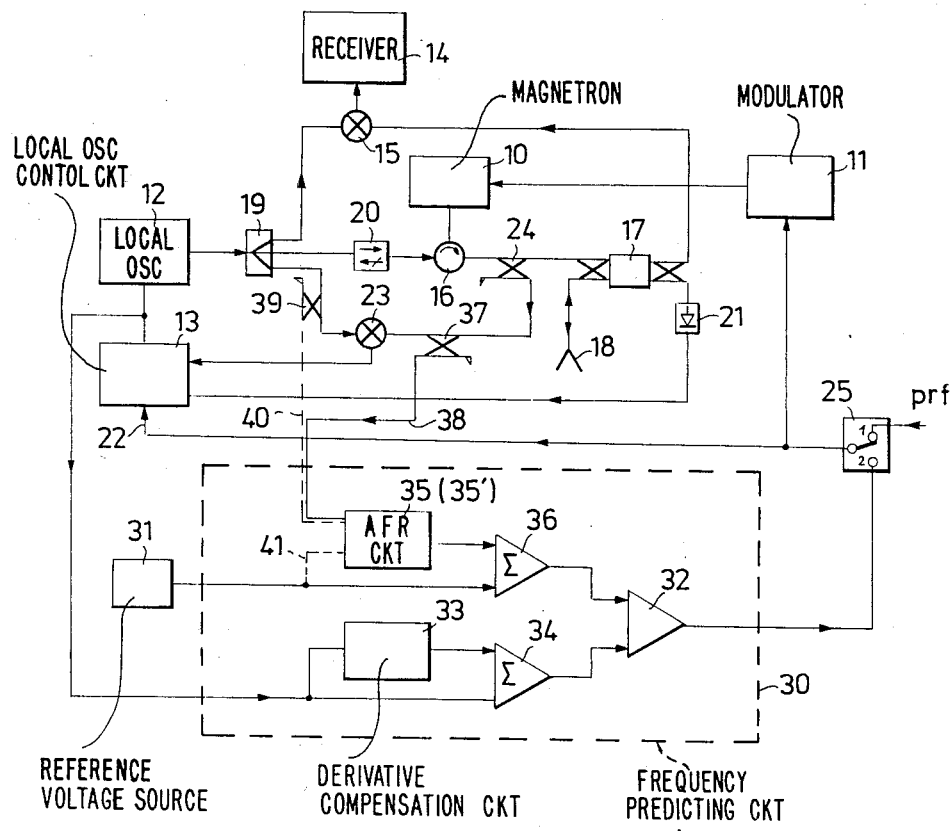
FIG. 1 shows a block diagram of a radar system having a frequency predicting circuit according to the invention.

In FIG. 1 reference numeral 10 designates a magnetron, the frequency of which can vary periodically with time, for example of the construction as described in the Swedish Pat. No. 177,412, 11 is a modulator for triggering the magnetron, 12 is a local oscillator having controllable frequency and being controlled by a LO-control circuit 13, while 14 is a receiver which obtains its input signal from an IF-mixer 15. When the magnetron 10 is triggered by the modulator 11 it will produce a HF-pulse, which via a circulator 16 and a TM switch 17 is led to an antenna 18 for transmission. Echo pulses caused by the transmitted pulse are received by the same antenna 18 and are led to one input of the mixer 15, which at a second input via a power divider 19 receives the output signal of the local oscillator 12. In the mixer 15 the echo pulses are transformed to intermediate frequency and in the receiver 14 they are evaluated in conventional manner.

The shown system then operates in two modes, on the one hand a jumping frequency mode and on the other hand a mode with predicted transmitter frequency. In both cases the tuning frequency of the magnetron is varied periodically with time and the frequency of the produced and transmitted pulses will be dependent upon the position of the triggering time moment in relation to the tuning curve obtained by the periodic tuning variation. In the interval before the triggering of the magnetron the local oscillator 12 is slaved to the magnetron, so that it follows the variations in the tuning frequency or cold frequency of the magnetron. This slave control is effected in a closed regulation loop of the kind as described in the Swedish Pat. No. 317417. The closed slave circuit for slave control of the oscillator to the magnetron is in FIG. 1 represented by the following elements as seen from the output to the control input of the local oscillator: the power divider 19, a uni-directional attenuator 20, the circulator 16, the tuning cavities of the magnetron 10, the TM switch 17, a follow-detector in the shape of a rectifier 21 and the LO control circuit 13 which delivers control voltage to the local oscillator 12. The slave control is in principle effected in such manner that the LO control circuit comprises a FM modulator, which produces a small frequency modulation of the oscillator frequency about the ground frequency of the oscillator. The FM-modulated signal is supplied via the power divider 19, the uni-directional attenuator 20 and the circulator 16 to the tuning cavities of the magnetron, and the energy reflected by the tuning cavities of the magnetron is led via the circulator 16 and the TM switch 17 to follow-detector 21. The energy reflected from the cavities of the magnetron has a minimum when the oscillator frequency coincides with the resonance frequency or cold frequency of the magnetron. Due to this variation of the reflected energy with the oscillator frequency the frequency modulation of the oscillator frequency about the ground frequency of the oscillator will be converted to an amplitude modulation in the reflected energy in case of a deviation between the oscillator frequency and the cold frequency of the magnetron. This amplitude modulation is detected in the rectifier 21, the output signal of which as to its size and phase is a measure of the deviation and is used to influence the ground frequency of the oscillator to coincide with the cold frequency of the magnetron by negative feedback in the closed regulation loop.

By means of a signal on the control input 22 of the LO control circuit 13 the described slave control of the oscillator 12 is interrupted in the triggering moment and the oscillator frequency is locked to the frequency value, which prevailed in the triggering moment. Thus, the intermediate frequency, to which the echo pulses are transformed in the IF mixer 15 will be equal to the difference between the warm frequency and cold frequency of the magnetron in the triggering moment. Due to the fact that this difference between cold and warm frequencies can be different at different parts of the tuning curve and also of other reasons the intermediate frequency can be different from pulse to pulse. In order to make a correction for this and produce an intermediate frequency, which is as constant from pulse to pulse as possible, there is a circuit for automatic frequency regulation or AFR, which for example can be of the kind as described in the Swedish Pat. No. 212257. The circuit for automatic frequency regulation of the intermediate frequency is in FIG. 1 represented by a mixer 23 having one input connected to the output of the local oscillator 12 via the power divider 19 and a second input connected to a directional coupler 24. This directional coupler 24 is included in the connection between the circulator 16 and the TM-switch 17 and will in the transmission moment transfer a small part of the transmitted pulse to the mixer 23. In the mixer 23 the transmitted pulse is compared with the output signal of the local oscillator and the mixing product is led to the control circuit 13 of the local oscillator for serving as a control signal for the automatic frequency regulation. This frequency regulation is according to the patent effected in such manner that the output frequency of the local oscillator immediately after transmission of a HF-pulse is imparted a stepwise correction in two steps, so that the desired intermediate frequency is obtained. The oscillator frequency achieved by the automatic frequency regulation is then maintained constant during the listening period.

The shown radar system can as mentioned operate in two modes, jumping frequency mode and predicted frequency mode, and can furthermore be rapidly switched from one mode to the other, which in FIG. 1 is effected by means of a two-position switch 25. In the position 1 of the switch 25 the system operates in the jumping frequency mode and in the position 2 it operates in the predicted frequency mode.

In the position 1 of the switch 25 and external pulse signal prf is led via the switch 25 on the one hand to the modulator 11 for triggering the magnetron 10 and on the other hand to the control circuit 13 of the local oscillator 12 in order to initiate the described frequency locking. The pulse signal prf can contain pulses which appear randomly in time or it may have a pulse frequency, which has no relationship with the periodic tuning variation of the magnetron, whereby the magnetron will be triggered at arbitrary positions of the tuning curve and the transmitted pulses will have randomly varying frequency from pulse to pulse.

In the second position 2 of the switch 25 this switch will lead—instead of the external pulse signal prf—the output signal from a frequency predicting circuit 30 to the modulator 11 for triggering the magnetron and to the control circuit 13 for frequency locking of the local oscillator. The frequency predicting circuit receives a first input signal from the output of the control circuit 13 of the local oscillator and a second input signal from a reference voltage source 31. At the output of the control circuit 13 there appears the control voltage of the local oscillator, which in turn represents the output frequency of the local oscillator and thereby due to the described slave control in the interval before triggering also the cold frequency of the magnetron The frequency predicting circuit 30 consists substantially of a comparator 32 to which the two voltages are applied, i.e. on the one hand the reference voltage and on the other hand the oscillator control voltage which represents the cold frequency of the magnetron, and which comparator delivers an output pulse, which at the same time forms the output signal of the whole frequency predicting circuit, when the two compared voltages are equal. The general principle for the frequency predicting circuit 30 is that the control voltage of the local oscillator in the comparator 32 is compared with the reference voltage and the magnetron is triggered when the control voltage is equal to the reference voltage. The reference voltage then corresponds to the desired transmitter frequency. In case of this simple frequency predicting, however, different frequency errors may arise.

One type of frequency error arises due to the fact that the control voltage of the local oscillator and the tuning frequency of the magnetron varies differently between the triggering time moment and the transmission time moment dependent upon where on the tuning curve the triggering occurs. This error can be compensated for by means of a derivative compensation circuit 33 and an adder 34. The derivative compensation circuit 33, which in the simplest embodiment can be an RC-circuit of differentiating type, receives at its input the control voltage of the local oscillator and delivers its output signal to one input of the adder 34. At its second input the adder 34 receives the control voltage of the local oscillator and the output signal from the adder 34 is led to the comparator 32. In the adder 34 the control voltage of the local oscillator is combined with a voltage component which is dependent upon the instantaneous time derivative of the control voltage, the size and polarity of the voltage component, added to the control voltage of the local oscillator in the adder 34 being such that the error is corrected.

Figure 2:
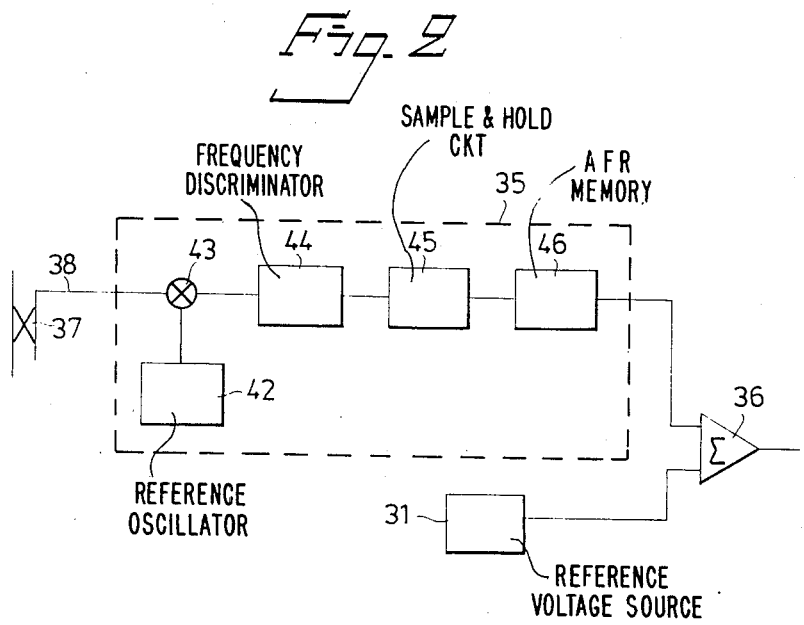
FIG. 2 shows a first embodiment of an AFR-circuit included in the frequency predicting circuit and FIG. 3 shows a second embodiment of the AFR-circuit.
Figure 3:
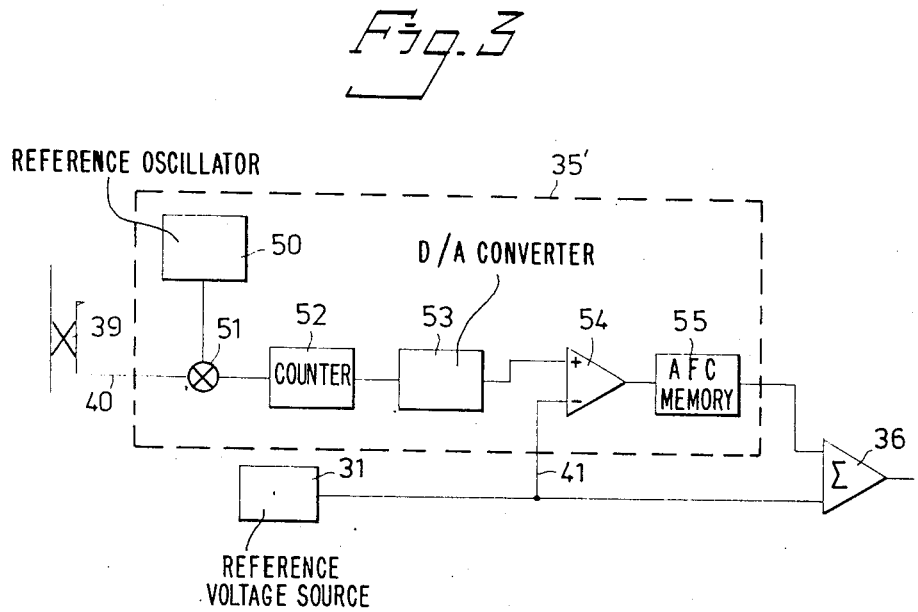

In order to achieve absolute frequency prediction the result of the frequency prediction, i.e. the really achieved frequency of a transmitter pulse with predicted frequency, must be supervised and used for correcting following pulses with predicted frequency. In FIG. 1 this is effected by means of an automatic frequency regulation circuit or AFR-circuit 35 (35') which via an adder 36 delivers an additional voltage component to the reference voltage before this voltage is fed to the comparator 32. The AFR-circuit can be of different constructions, two of which are shown in FIG. 2 and FIG. 3. In the first embodiment of the AFR circuit, shown in FIG. 2, a small fraction of the transmitter pulse from the magnetron is applied to the same, which fraction is derived from the connection between the directional coupler 24 and the mixer 23 via a directional coupler 37, as shown by the full line 38. In the second embodiment, shown in FIG. 3, a fraction of the output voltage of the local oscillator is applied to the AFR-circuit, which fraction is derived from the connection between the power divider 19 and the mixer 23 via a directional coupler 39, as shown by the dashed line 40. In the said last embodiment the AFR circuit receives furthermore at a second input the reference voltage from the reference voltage source 31, as shown by the dashed line 41.

According to FIG. 2 the AFR-circuit 35 in the first embodiment consists of a reference oscillator 42, a mixer 43, a frequency discriminator 44, a sample-and-hold circuit 45 and an AFR-memory 46. In the mixer 43 the fraction of the transmitted pulse, which is transferred through the directional coupler 37, is mixed with the voltage from the reference oscillator 42 and the mixing product is fed to the frequency discriminator 44. In this a voltage will be produced, which represents the deviation between the frequency of the transmitted pulse and the frequency of the reference oscillator 42, which voltage is sampled in the sample-and-hold circuit 45 and stored in the memory 46. The value stored in the memory 46 is then fed to one input of the adder 36 for serving as a correction of the reference voltage, which is fed to the second input of the adder 36. The function is that, when the first pulse with predicted frequency has been transmitted, the AFR-memory 46 contains a magnitude which represents the deviation between the frequency of the transmitted pulse and the frequency of the local oscillator 42. When thereafter pulses with predicted frequency are transmitted the value stored in the memory 46 will be combined with such polarity with the reference voltage in the adder 36 that the said deviation for the following pulses with predicted frequency will be zero. In this case it is consequently the frequency of the reference oscillator 42, which is decisive for the predicted frequency of the transmitted pulses, or the desired value of the predicted frequency.

In the second embodiment the AFR-circuit 35' consists according to FIG. 3 of a reference oscillator 50, a mixer 51, a counter 52, a digital/analogue converter 53, an adder 54 and an AFC-memory 55. In the mixer 51 a fraction of the output voltage of the local oscillator 12, which has been coupled via the directional coupler 39, is mixed with the output voltage of the reference oscillator 50, the frequency of which is selected such that the mixer 51 at its output delivers a suitable difference frequency. This difference frequency is measured by feeding it to the counter 52 which counts the number of cycles during a given time. The output magnitude of the counter is then converted to an analogue voltage in the digital/analogue converter 53. The part of the AFR-circuit 35' described so far, i.e. the reference oscillator 50, the mixer 51, the counter 52 and the converter 53, forms a frequency measuring circuit which measures the frequency of the local oscillator and delivers a voltage which is proportional to the measured frequency. In the adder 54 the voltage is compared with the reference voltage from the reference voltage source 31, which two voltages are fed to the adder with different signs, and the difference between the voltages is stored in the AFC-memory 55. The function is that, in the listening interval after transmission of the first pulse with predicted frequency, when the local oscillator frequency is locked to a value which is determined by the reference voltage, but without help of the AFR-circuit because the AFC-memory as yet does not have any content, the local oscillator frequency is measured by the measuring circuit 50, 51, 52, 53 and that the deviation between the voltage representing the measured local oscillator frequency, which in turn represents the magnetron frequency, and the reference voltage is stored in the AFC-memory 55. When pulses with predicted frequency thereafter are transmitted the voltage value stored in the memory 55 will be combined with the reference voltage with such polarity in the adder 36 that the said deviation for the following pulses with predicted frequency will be zero. In this case it is the reference voltage source 31, which is decisive for the predicted frequency of the transmitted pulse and the output voltage of which represents the desired value of the transmitted frequency.

What is claimed is:

1. A radar system comprising a periodically-tunable transmitter tube for producing radar pulses each having a respective frequency determined by an instant during a respective triggering interval when a trigger signal is applied to the tube, a modulator coupled to the tube for applying the trigger signal in response to an applied trigger-control signal, a local oscillator for producing an output signal having a frequency which varies in response to an applied frequency-control signal, means for transmitting the radar pulses and receiving echo pulses derived from the radar pulses, a mixer for receiving the echo pulses and the variable-frequency output signal and for producing an intermediate-frequency signal, and control means for supplying said trigger-control signal and said frequency-control signal, characterized in that said control means comprises:
   a. a slave-control circuit coupled to the transmitter tube for sensing the instantaneous tuning frequency of said tube and for producing the frequency-control signal in response to said sensed tuning frequency, said signal controlling the frequency of the local oscillator output signal such that between triggering intervals, said frequency follows the tuning frequency and, during each triggering interval, said frequency is locked to the tuning frequency at the instant of triggering;
   b. a frequency-predicting circuit including comparator means for comparing the variable-frequency output signal with a reference signal representing a predetermined frequency and, upon the occurrence of a predetermined relationship between the frequencies represented by said signals, producing a predicted-frequency trigger-control signal, said frequency-predicting circuit further including a correction circuit for sensing the frequency of a radar pulse transmitted in response to said trigger-control signal, said correction circuit including means for comparing said radar pulse frequency with the predetermined frequency and for storing a result of said comparison to effect correction of the frequency of a radar pulse produced in response to a subsequent one of said trigger control signals; and
   c. means for selectively supplying to the modulator either the predicted-frequency trigger-control signal or a random trigger-control signal for effecting triggering of the transmitter tube at randomly-occurring frequencies.

2. A radar system as in claim 1, characterized in that the correction circuit comprises a reference oscillator for producing an output signal having the predetermined frequency, a mixer for receiving the reference oscillator output signal and a signal representative of the sensed radar pulse and for producing an output signal, an FM discriminator for receiving the mixer output signal and producing a difference signal representing the difference between the frequency of the reference oscillator output signal and the frequency of the sensed radar pulse, and a memory for storing the difference signal and for applying said signal to the comparator means.

3. A radar system as in claim 1, characterized in that the correction circuit comprises a measuring arrangement coupled to the local oscillator for producing an output signal representative of the frequency of the local oscillator output signal while it is locked to the tuning frequency, a subtraction circuit for receiving the measuring arrangement output signal and the reference signal representing a predetermined frequency and producing a difference signal representing the difference between the local oscillator frequency and the predetermined frequency, and a memory for storing the difference signal and for applying said signal to the comparator means.

4. A radar system as in claim 3, characterized in that the measuring arrangement comprises a reference oscillator for producing an output signal having a predetermined frequency, a mixer for receiving the reference oscillator output signal and a signal representative of the local oscillator output signal and for producing an output signal, and a counter for counting the number of cycles in the mixer output signal during a predetermined time period, said output signal being representative of the count obtained during said period.

5. A radar system as in claim 4, characterized in that the measuring arrangement includes a digital/analog converter coupled to the counter for converting the count therein to an analog signal, said analog signal forming the output signal of the measuring arrangement.

* * * * *